L. B. THOMAS.
COMBINED MEASURING AND DISPENSING ATTACHMENT FOR BINS.
APPLICATION FILED OCT. 16, 1911.
1,065,482.
Patented June 24, 1913.
3 SHEETS—SHEET 3.
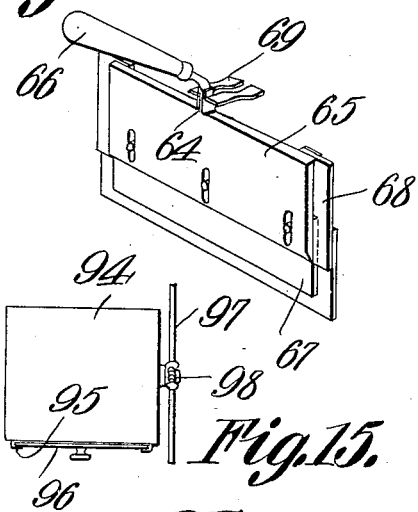
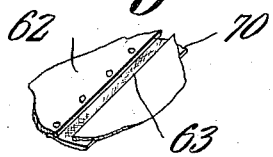
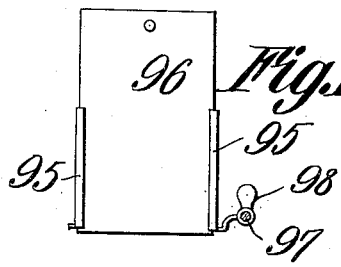
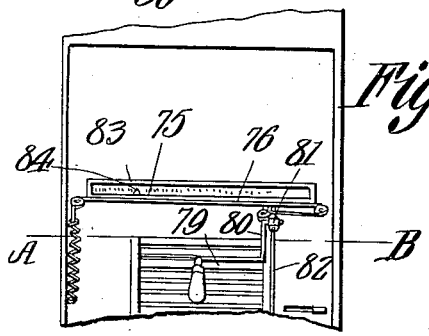
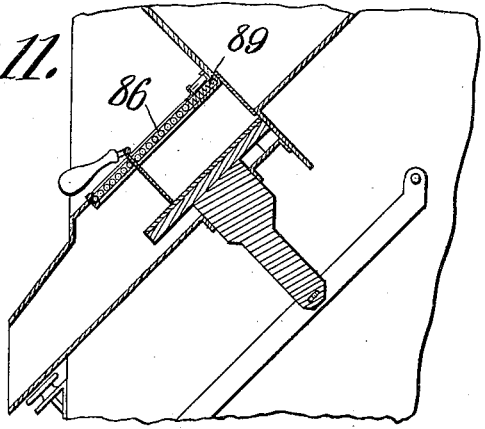
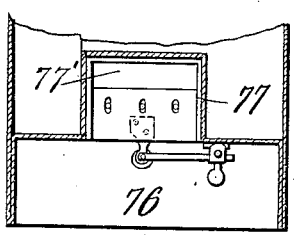
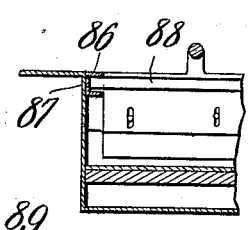
Witnesses
Luther B. Thomas
Inventor,
by C. A. Snow & Co.
Attorneys.

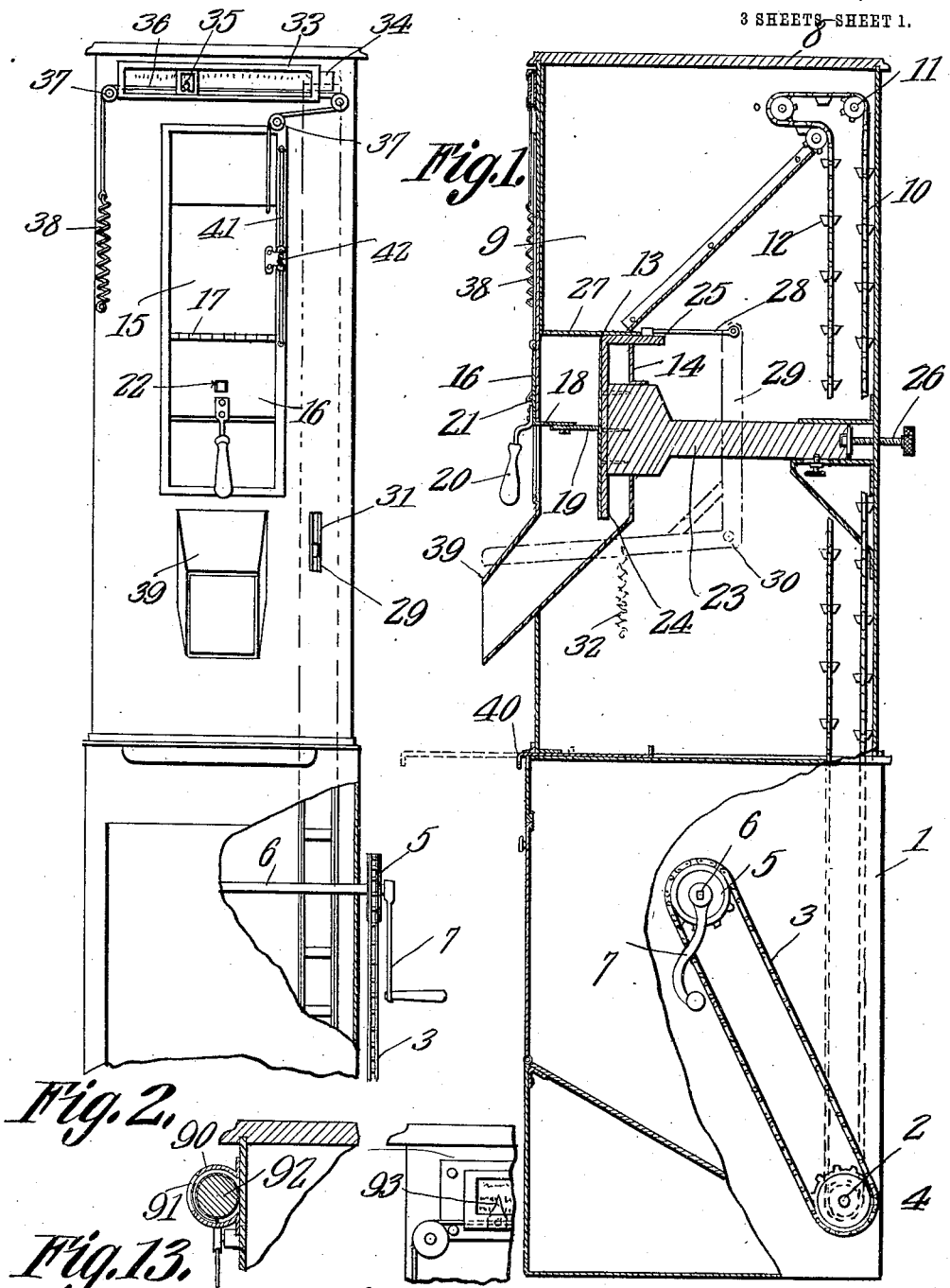

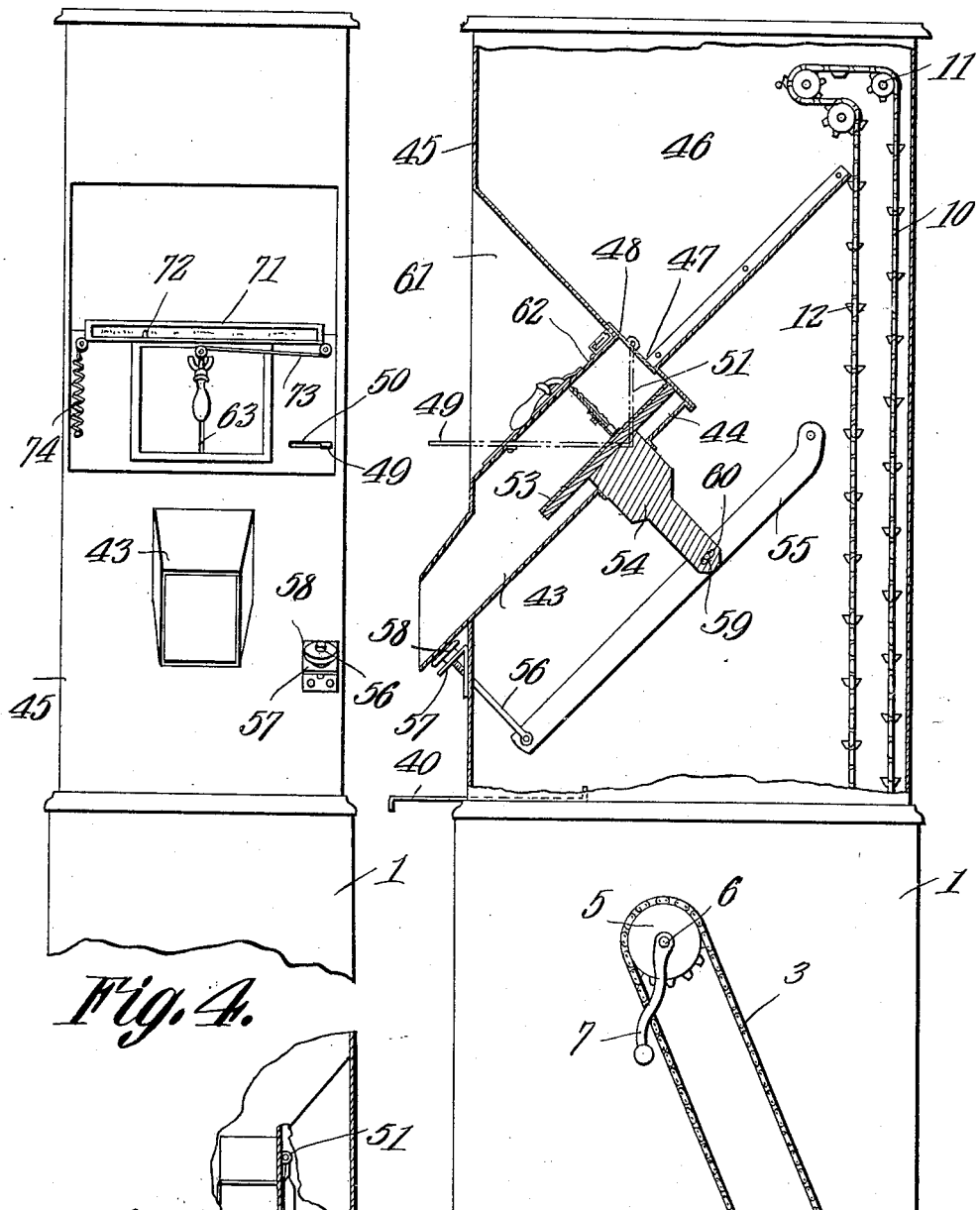

UNITED STATES PATENT OFFICE.

LUTHER B. THOMAS, OF SHREVEPORT, LOUISIANA.

COMBINED MEASURING AND DISPENSING ATTACHMENT FOR BINS.

1,065,482.     Specification of Letters Patent.     Patented June 24, 1913.

Application filed October 16, 1911. Serial No. 654,900.

*To all whom it may concern:*

Be it known that I, LUTHER B. THOMAS, a citizen of the United States, residing at Shreveport, in the parish of Caddo and State of Louisiana, have invented a new and useful Combined Measuring and Dispensing Attachment for Bins, of which the following is a specification.

This invention relates to computing bins and is more particularly an improvement upon the structure disclosed in an application filed by me on January 12, 1911, said application bearing Serial Number 602,318.

One of the objects of the present invention is to increase the capacity of the structure by utilizing a storage bin having means whereby the contents thereof can be elevated into an upper or dispensing compartment.

A further object is to provide improved means for measuring the material to be dispensed.

A still further object is to provide an indicator under the control of the measuring mechanism, for disclosing the amount measured and the price charged therefor.

Another object is to provide means for preventing leakage of the measured material from the apparatus.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred forms of the invention have been shown.

In said drawings: Figure 1 is a view partly in side elevation and partly in section of a bin having the present improvements embodied therein. Fig. 2 is a front elevation of the bin, parts being broken away. Fig. 3 is a view partly in side elevation and partly in section of a modified form of apparatus. Fig. 4 is a front elevation of a portion of the structure shown in Fig. 3. Fig. 5 is a horizontal section through a portion of the apparatus and showing the slide shifting lever in plan. Fig. 6 is a perspective view of the adjustable cut-off used in connection with the bin shown in Figs. 3 and 4. Fig. 7 is an enlarged perspective view of a portion of the top plate of the measuring compartment and showing the slot therein and the closure for the slot. Fig. 8 is a vertical section through a portion of another modified form of bin. Fig. 9 is an enlarged longitudinal section through the top of the measuring compartment shown in Fig. 8. Fig. 10 is a transverse section through said compartment. Fig. 11 is a plan view of a portion of another modified form of bin. Fig. 12 is a section on line A—B Fig. 11. Fig. 13 is a transverse section through a modified form of indicator. Fig. 14 is a front elevation of one end portion thereof. Fig. 15 is a plan view of a modified form of cut-off and connections. Fig. 16 is a front elevation thereof.

Referring to the figures by characters of reference 1 designates a storage bin having a transverse shaft 2 in the bottom portion thereof and which may be driven by means of a chain 3 engaging a sprocket 4 secured to the shaft 2 and another sprocket 5 secured to an actuating shaft 6. Said actuating shaft may be driven by means of a crank 7 or the like. Obviously any other suitable means may be used for driving the shaft 2.

The bin 1 constitutes a pedestal on which is mounted an upper dispensing bin 8 having a dispensing compartment 9 in the upper portion thereof and which is adapted to be supplied from the storage bin 1 by means of an endless elevator 10. This elevator is actuated by the shaft 2 and is mounted on guide sprockets 11 or the like mounted in the upper portion of the bin 8, said elevator having a portion thereof overhanging the compartment 9 so that, as the buckets 12 of the elevator are brought successively into position above said compartment 9, they will dump their contents into the compartment.

The compartment 9 is provided with an outlet 13 opening into a measuring compartment 14 the front of which is preferably closed by means of a slide 15 similar to that disclosed in my application hereinbefore mentioned. A leaf 16 is hingedly connected to the outer face of the plate 15, as indicated at 17 and extends throughout the width of the exposed portion of the front face of the slide 15. A cut-off plate 18 extends at right angles from the lower edge of the leaf 16 and projects under the lower edge of plate 15 and into the measuring compartment 14. This cut-off plate is preferably provided with an adjustable extension 19 whereby the cut-off can be shortened or elongated as desired and the cut-off and its extension projects throughout the width of the measuring compartment 14 so as to fit snugly against the side walls thereof. A handle 20 is connected to the lower portion of the leaf 16 whereby the cut-off can be readily swung about the hinge 17 as a center and a spring catch 21 is preferably arranged on the outer face of the plate 15 and projects into an opening 22 in the leaf 16 so as to lock the leaf against the plate 15.

A stem 23 is adjustably mounted in the back wall of the measuring compartment 14 and carries a back plate 24 from the upper edge of which extends a flange 25 which bears downwardly on the upper edge of the back wall of the compartment 14. Stem 23 is adjustably connected to back portion of the bin 8, an adjusting screw 26 or the like being provided for the purpose of shifting the stem toward or away from the front of the bin so as to move the plate 24 toward or away from the slide 15. It is to be understood that the cut-off plate 18 is adjustable so that, when the leaf 16 is locked to the plate 15 by means of the catch 21, the extension 19 will bear snugly against the back plate 24.

A slide valve 27 is mounted on the upper end of the measuring compartment 14 and serves normally to close the outlet 13, this valve bearing downwardly on the flange 25 and being connected, as by means of a link 28, to one arm of a bell crank lever 29 which is fulcrumed, as at 30, within the bin 8. The other arm of the bell crank lever extends forwardly through a slot 31 in the front of the bin, where it can be easily grasped for the purpose of actuating the valve. It will be apparent that by pulling upwardly on the forwardly projecting end of the lever 29, the valve 27 will be slid rearwardly so as to permit material to pass through the opening 13 and into the measuring compartment 14. A spring 32 may be connected to the lever 29 at any desired point so as to hold the valve 27 normally closed.

A casing 33 extends across the front of the bin 8 adjacent the top thereof and has an open front face through which appears a graduated strip 34 having data thereon indicating pounds and the prices thereof and the price to be asked therefor. This strip 34 is removably mounted within the casing 33 and is prepared for use in connection with one kind of material to be dispensed. Should another kind of material of a different weight and price be substituted, a different strip 34 would be inserted into the casing 33. An index or pointer 35 is mounted to slide longitudinally of the casing 33 and is connected to a cord 36 or the like. This cord extends longitudinally through the casing 33 and is mounted on guide sheaves 37. One end of the cord is attached to the slide 15 while the other end is connected to a spring 38 which, in turn is secured to the bin 8. It will be apparent that when the slide 15 is pulled downwardly the cord 36 will be moved therewith and cause the pointer or index 35 to move longitudinally of the casing 33, thus elongating the spring 38. When, however, the slide 15 is raised, the spring 38 will hold the cord taut and move the index in the opposite direction.

The measuring compartment 14 opens, at its lower end, into an outlet spout 39 which is gradually reduced, in transverse area, toward its discharge end. A leaf 40 is slidably mounted between the bins 1 and 8 and is adapted to be drawn outward so as to form a support for a box, sack or the like into which material is to be discharged from the spout 39. In order that the slide 15 may be securely held in any position to which it may be adjusted, a guide rod 41 is secured to the front face of the bin 8 and close to one side of the slide 15 and engaged by a spring clip 42 of any suitable construction, said clip being attached to the slide 15. It will be apparent that by adjusting the stem 23 so as to move back plate 24 within the compartment 14, the transverse area of the compartment to be filled from the dispensing compartment 9 can be varied at will so as to suit the material to be dispensed. It is of course necessary to adjust the cut-off plate 18 and its extension 19 after the back plate 24 has been adjusted so as to insure a tight fit between the cut-off and the walls of the measuring compartment when the leaf 16 has been secured against the slide 15 by the catch 21. After the parts have thus been adjusted and the dispensing compartment 9 has been filled, the cut-off 18 can be adjusted by first releasing clip 42 from engagement with rod 41 and then shifting the slide 15 until the index 35 points to the graduation indicating the quantity to be dispensed. Handle 20 is then pulled forwardly and upwardly and will swing the cut-off plate 18 outwardly from under the slide 15, thus permitting the contents of the measuring compartment to gravitate off of the cut-off plate and into the spout 39. It is of course to be understood that while the material is being discharged from the measuring compartment, the valve 27 is to be closed.

Instead of constructing the apparatus as shown in Figs. 1 and 2, the same may be made as indicated in Figs. 3 and 4. It will be noted by referring to these figures that the outlet spout 43 is in alinement with the measuring compartment 44, both of them being inclined at an angle of about 45 degrees or more to the bottom of the bin. The dispensing bin 45 in this modified form has a dispensing compartment 46 corresponding with the compartment 9 and the outlet 47 in said compartment opens into the upper end of the measuring compartment 44, said outlet being normally closed by a laterally movable slide 48. Said slide is preferably operated by means of a horizontal lever 49 one end of which extends through a transverse slot 50 in the front of the bin 45 while the other end has an arm 51 extending perpendicularly therefrom and pivotally connected to one side of the slide 48. Thus it will be seen that when the lever is pushed to one side the slide will be opened and when the front end of the lever is pushed in the opposite direction the slide will be closed. A spring 52 may be located at any suitable point and is attached to the lever 49 so as to hold the slide normally closed. The measuring compartment 44 shown in Fig. 3 is provided with a back plate 53 similar to the plate 24 and having a stem 54 adjustably mounted in the back or lower wall of the compartment 44. The means provided for adjusting the stem preferably consists of a lever 55 fulcrumed at one end within the bin 45 and having an adjusting screw 56 pivotally connected to its other end and extending through a bracket 57 on the front face of the bin 45. Said screw is engaged by an adjusting nut 58 whereby the lever 55 can be swung upwardly or downwardly so as to move the stem 54 and the plate 53 in the desired direction. It is to be understood of course that there is a movable connection between the lever 55 and the stem 54, said connection being preferably in the form of a pin 59 mounted within a slot 60, as shown in Fig. 3.

When the measuring compartment 44 is inclined, as illustrated in Fig. 3, it is preferably extended under the dispensing compartment 46 so that a recess 61 is thus formed between the bottom of the compartment 46 and the top of the measuring compartment 44. The bottom of this recess is formed by the top plate 62 of the measuring compartment and this top plate may be one of several forms. In the form shown in Figs. 3 and 4, the top plate has a longitudinal slot 63 formed in the center thereof and within which slides a flat shank 64 of a cut-off plate 65. A handle 66 is connected to the outer end of the shank while the plate 65 is located at the inner end thereof. This plate has an extension 67 adjustably connected to it and it will thus be seen that the cut-off can be adjusted so as to fit close to the walls of the measuring compartment after the back plate 53 has been adjusted to any desired point. Packing strips 68 of felt or any other soft material are preferably connected to the edge portions of the plate 65 and its extension 67 so as to prevent leakage past the plate. Springs 69 are attached to the shank 64 and bear downwardly upon the outer face of the top plate 62 so as to prevent the said plate from swinging downwardly under the weight of the contents of the compartment 44.

The slot 63 is normally closed by means of a flexible strip 70 of felt or the like. An indicator 71 similar to that heretofore described, is located upon the top plate 62 above the slot 63 and the index 72 of the indicator is connected by a cord 73 to the shank 64 and to a spring 74. Thus it will be seen that when the cut-off 65 is shifted longitudinally of the slot 63, the amount being measured will be accurately designated by the indicator 72. When the cutoff 65 is shifted along the measuring compartment 44, its shank 64 will press the flexible closure 70 to one side and said closure will promptly move back to its normal position so as to close the slot after the shank 64 has passed. As hereinbefore stated the springs 69 serve to hold the cut-off plate 65 so that it will not tilt under the weight of the contents of the measuring compartment. When, however, said cut-off plate has been adjusted to a desired point and the measuring compartment has been filled, the handle 66 can be swung upwardly and backwardly, thus placing the springs 69 under stress and causing the cut-off 65 to swing downwardly. The contents of the measuring compartment will therefore be free to gravitate downwardly into the spout 43.

In Fig. 11 another form of top plate has been shown, said plate which has been illustrated at 75, being formed with a series of parallel slots 76 extending transversely of the plate and throughout the width of the measuring compartment 77. Any one of these slots is adapted to receive a cut-off plate 77' having a handle 78 extending downwardly from its outer edge. Said cut-off plate is connected to one end of an arm 79 extending laterally from a strip 80 which, in turn, is pivotally connected to a sleeve 81 slidably mounted on a guide rod 82. Said sleeve is provided with a spring clip of any desired form for locking it in any position to which it may be adjusted. It will be apparent that by releasing the clip from the guide rod 82 the sleeve 81 can be moved along said rod to any desired point and the cut-off plate 77' can then be swung downwardly into any one of the slots 76 which may have been selected. In this form of device an indicator 83 similar to that hereinbefore described is employed and the index 84 thereof is operated by a spring drawn cord connected to the sleeve 81. This form of slotted top plate 75 is only to be used where beans or other comparatively large seeds or grains are to be dispensed.

In Figs. 8, 9 and 10, another form of top plate has been illustrated, the same being designed to be used in connection with very small seeds or cereals. The top plate 85 of this device has an opening 86 the side walls of which are grooved, as indicated at 87 so as to receive the ends of rollers 88. These rollers are held normally in contact by means of springs 89 bearing against one of the end rollers. The cut-off to be used in connection with this structure is the same as that disclosed in Figs. 11 and 12 and it will be apparent that after it has been adjusted to a desired position, it can be swung downwardly so as to wedge between two selected rollers, thus spreading them apart and permitting the cut-off plate to move downwardly into the measuring compartment. Leakage of material between the remaining rollers is of course prevented in view of the fact that said rollers are normally in contact.

Instead of using removable index strips with the various indicators, and as shown at 34 in Fig. 2, a cylindrical casing 90 may be substituted for the casing 33 or the corresponding parts in the other constructions, said casing having a slot in the front portion thereof as indicated at 91. A cylinder 92 can then be mounted for rotation within the casing and can be provided with parallel series of graduations and characters readable therewith, each series relating to one kind of material to be dispensed, so that by rotating the cylinder a desired series of graduations can be brought into view and can be read in connection with the index 93 which works along the slot 91 and is operated in the same manner as the index 35 hereinbefore described.

Instead of mounting the cut-off upon a pivoted structure, as illustrated in several of the figures heretofore described, a slide 94 may be mounted on the top plate of the measuring compartment and may be provided with an upstanding guide 95 in which the cut-off 96 is adapted to slide. The slide 94 may be connected to a guide rod 97 by means of a clip 98 fastened to the slide. This structure has been illustrated in Figs. 15 and 16.

What is claimed is:—

1. The combination with an adjustable measuring compartment having an outlet, of a cut-off adjustable longitudinally of and located within the compartment, and means for inclining the cut-off toward the outlet to release the contents of the compartment.

2. The combination with an adjustable measuring compartment, said compartment having an outlet, of a cut-off adjustable longitudinally of the compartment and for closing the outlet, and means for inclining the cut-off for releasing the contents of the compartment.

3. The combination with an adjustable measuring compartment, said compartment having an opening in one wall thereof, of a cut-off movably mounted within the opening, means for inclining the cut-off to release the contents of the compartment, and means for maintaining the opening normally closed.

4. The combination with a measuring compartment, of a cut-off movable longitudinally of the compartment, an indicator, and means operated by the cut-off when shifted longitudinally of the compartment, for moving the indicator transversely of the compartment.

5. A bin having a measuring compartment, a cut-off for varying the length of the measuring compartment, an indicator movable transversely of the bin, and means operable by the cut-off when shifted longitudinally of the measuring compartment, for actuating the indicator.

6. The combination with a dispensing bin having a dispensing compartment, and an adjustable measuring compartment communicating with the dispensing compartment, of means for closing communication between said compartments, an outlet spout communicating with the measuring compartment, and an inclinable cut-off mounted to move into or out of and slidably connected to the bin.

7. The combination with a dispensing bin having a dispensing compartment, and an adjustable measuring compartment communicating with said dispensing compartment, of means for closing communication between the compartments, an inclinable cut-off mounted to move into and out of the measuring compartment, said cut-off being adjustable longitudinally of the measuring compartment, and means operated by the cut-off during such longitudinal adjustment for indicating the bulk of the contents of the measuring compartment.

8. Apparatus of the class described including a dispensing compartment, a measuring compartment communicating therewith, means for closing communication between the compartments, a back plate adjustably mounted within the measuring compartment, an inclinable cut-off plate adjustable longitudinally of the measuring compartment, and means for shifting the cut-off plate into and out of the measuring compartment.

In testimony that I claim the foregoing as my own, I have hereto affixed my signature in the presence of two witnesses.

LUTHER B. THOMAS.

Witnesses:
FRANK B. OCHSENREITER,
A. C. BURKE.

Copies of this patent may be obtained for five cents each, by addressing the "Commissioner of Patents, Washington, D. C."